United States Patent
Matsumura

(10) Patent No.: US 7,481,257 B2
(45) Date of Patent: Jan. 27, 2009

(54) PNEUMATIC TIRE AND TIRE MOLD

(75) Inventor: Tomoyuki Matsumura, Hiratsuka (JP)

(73) Assignee: The Yokahama Rubber Co., Ltd., Tokyo (JP)

( * ) Notice: Subject to any disclaimer, the term of this patent is extended or adjusted under 35 U.S.C. 154(b) by 274 days.

(21) Appl. No.: 11/029,376

(22) Filed: Jan. 6, 2005

(65) Prior Publication Data

US 2005/0150582 A1    Jul. 14, 2005

(30) Foreign Application Priority Data

Jan. 9, 2004    (JP)    ............................. 2004-004219

(51) Int. Cl.
  *B29C 33/42*    (2006.01)
  *B60C 11/12*    (2006.01)
(52) U.S. Cl. ............................. 152/209.2; 152/209.18; 152/DIG. 3; 425/28.1; 425/35; 425/46; 425/47
(58) Field of Classification Search ............. 152/209.2, 152/209.3, 209.18, DIG. 3; 425/28.1, 35, 425/46, 47
  See application file for complete search history.

(56) References Cited

U.S. PATENT DOCUMENTS

| | | | | |
|---|---|---|---|---|
| 2,272,879 A | * | 2/1942 | Hargraves | ............... 152/DIG. 3 |
| 2,736,924 A | * | 3/1956 | Bean | ........................ 425/28.1 |
| 4,449,560 A | * | 5/1984 | Tansei et al. | ................ 152/900 |
| 5,120,209 A | * | 6/1992 | MacMillan | ................... 425/46 |
| 5,204,036 A | * | 4/1993 | MacMillan | ................... 425/46 |
| 5,211,781 A | * | 5/1993 | Adam et al. | ............ 152/DIG. 3 |
| 5,234,326 A | * | 8/1993 | Galli et al. | ..................... 425/46 |
| 5,327,953 A | * | 7/1994 | Ichiki | ..................... 152/DIG. 3 |
| 6,196,288 B1 | * | 3/2001 | Radulescu et al. | ..... 152/DIG. 3 |
| 6,264,453 B1 | * | 7/2001 | Jacobs et al. | ................ 425/28.1 |
| 2006/0162832 A1 | * | 7/2006 | Stuhldreher | ............ 152/DIG. 3 |

FOREIGN PATENT DOCUMENTS

| | | | |
|---|---|---|---|
| CA | 1313116 | * | 1/1993 |
| EP | 579436 | * | 1/1994 |
| JP | 05-178018 A1 | | 7/1993 |
| JP | 2002-225038 | * | 8/2002 |

* cited by examiner

*Primary Examiner*—Steven D Maki
(74) *Attorney, Agent, or Firm*—Greer, Burns & Crain, Ltd.

(57) ABSTRACT

A pneumatic tire is cured and molded by a sectional type tire mold including an annular side mold section having a tread forming surface for forming a tread surface, the side mold section comprising a plurality of sectors into which the side mold section is divided along a circumferential direction of the side mold section. A tread surface, which has first regions formed by sector divisional position vicinity regions of the side mold section and second regions formed by sector divisional position distant regions of the side mold section, has lands defined by at least one circumferential groove which extends in a circumferential direction of the tire. Sipes which extend from the at least one circumferential groove into at least one of the lands with their extension ends located within the at least one land are disposed at predetermined intervals along the tire circumferential direction. The sipes comprise first sipes in the first regions and second sipes in the second regions. Each first sipe has a tire widthwise direction length W1 less than the tire widthwise direction length W2 of each second sipe.

19 Claims, 5 Drawing Sheets

PNEUMATIC TIRE AND TIRE MOLD

BACKGROUND OF THE INVENTION

The present invention relates to a pneumatic tire and a tire mold used for curing and molding the pneumatic tire, and more particularly, to a pneumatic tire and a tire mold which can inhibit a land in a tread surface from chipping and cracking.

Conventionally, for example, there are pneumatic tires including a tread surface having lands which comprise ribs defined by circumferential grooves extending in a circumferential direction of the tire, and sipes disposed in the lands at predetermined intervals along the tire circumferential direction, each of the sipes extending in a widthwise, direction of the tire with only one end thereof being open to a circumferential groove (see Unexamined Japanese Patent Application Publication No. 5-178018, for example).

The pneumatic tires having ribs with these sipes are generally cured and molded using a sectional type tire mold having an annular side mold section with a tread forming surface for forming a tread surface which is composed of a plurality of sectors into which the side mold section is divided along its circumferential direction, instead of using a tire mold consisting of two mold-halves, thereby preventing the lands from chipping and land parts located at the sipe ends from cracking.

However, merely using the sectional type tire mold, chipping and cracking can not effectively prevented and may often occur, due to rubber materials employed for a tire tread. Especially, these drawbacks are apt to occur in the vicinity of sector divisional positions.

SUMMARY OF THE INVENTION

An object of the present invention is to provide a pneumatic tire and a tire mold which can inhibit a land from chipping and cracking.

In order to achieve the above object, the present invention provides a pneumatic tire which is cured and molded by a sectional type tire mold including an annular side mold section having a tread forming surface for forming a tread surface, the side mold section comprising a plurality of sectors into which the side mold section is divided along a circumferential direction of the side mold section, the tread forming surface of the side mold section having sector divisional position vicinity regions including sector divisional positions and sector divisional position distant regions located therebetween, the pneumatic tire having a tread surface which includes first regions formed by the sector divisional position vicinity regions and second regions formed by the sector divisional position distant regions, the tread surface having lands defined by at least one circumferential groove which extends in a circumferential direction of the tire, sipes which extend from the at least one circumferential groove into at least one of the lands with their extension ends located within the at least one land being disposed at predetermined intervals along the tire circumferential direction, wherein the sipes comprise first sipes in the first regions and second sipes in the second regions, and each first sipe has a tire widthwise direction length W1 less than the tire widthwise direction length W2 of each second sipe.

A tire mold according to the present invention includes an annular side mold section having a tread forming surface for forming a tread surface of a tire, the side mold section comprising a plurality of sectors into which the side mold section is divided along a circumferential direction of the side mold section, the tread forming surface of the side mold section having sector divisional position vicinity regions including sector divisional positions and sector divisional position distant regions located therebetween, each sector including a tread forming surface section, at least one circumferential groove forming ridge which extends in a circumferential direction of the side mold section and sipe forming blades which are connected to at least one side surface of the at least one circumferential groove forming ridge and extend from the at least one side surface of the at least one circumferential groove forming ridge in a widthwise direction of the side mold section protruding on the tread forming surface section of each sector, the sipe forming blades having extension ends which are located within the tread forming surface section of each sector and being disposed at predetermined intervals along the circumferential direction of the side mold section, wherein the sipe forming blades comprise first sipe forming blades located in the sector divisional position vicinity regions and second sipe forming blades in the sector divisional position distant regions, and each first sipe forming blade has a side mold section widthwise direction length W'1 less than the side mold section widthwise direction length W'2 of each second sipe forming blade.

As described above, the side mold section widthwise direction lengths W'1 of the first sipe forming blades are less than the side mold section widthwise direction lengths W'2 of the second sipe forming blades, and the tire widthwise direction lengths W1 of the first sipes are less than the tire widthwise direction lengths W2 of the second sipes, whereby removal of the first sipe forming blades in the sector divisional position vicinity regions can be facilitated because of avoiding large external forces acting upon the land when removed. Therefore, chipping of edge portions of the land facing to the first sipes and the circumferential groove, and cracking of parts of the land facing to edge portions of the first sipes can be suppressed.

The present invention provides another pneumatic tire which is cured and molded by a sectional type tire mold including an annular side mold section having a tread forming surface for forming a tread surface, the side mold section comprising a plurality of sectors into which the side mold section is divided along a circumferential direction of the side mold section, the tread forming surface of the side mold section having sector divisional position vicinity regions including sector divisional positions and sector divisional position distant regions located therebetween, the pneumatic tire having a tread surface which includes first regions formed by the sector divisional position vicinity regions and second regions formed by the sector divisional position distant regions, the tread surface having lands defined by at least one circumferential groove which extends in a circumferential direction of the tire, sipes which extend from the at least one circumferential groove into at least one of the lands with their extension ends located within the at least one land being disposed at predetermined intervals along the tire circumferential direction, wherein the sipes comprise first sipes in the first regions and second sipes in the second regions, each first sipe including an extension end portion having edge portions on both sides thereof, at least one of the edge portions of each first sipe located on the remote side of the first sipe from a position in a first region of the tread surface where the first sipe is located having a shape to be chamfered, the position in a first region of the tread surface conforming to one of the sector divisional positions.

Another tire mold according to the present invention includes an annular side mold section having a tread forming surface for forming a tread surface of a tire, the side mold section comprising a plurality of sectors into which the side mold section is divided along a circumferential direction of the side mold section, the tread forming surface of the side mold section having sector divisional position vicinity regions including sector divisional positions and sector divisional position distant regions located therebetween, each sector including a tread firming surface section, at least one circumferential groove forming ridge which extends in a circumferential direction of the side mold section and sipe forming blades which are connected to at least one side surface of the at least one circumferential groove forming ridge and extend from the at least one side surface of the at least one circumferential groove forming ridge in a widthwise direction of the side mold section protruding on the tread forming surface section of each sector, the sipe forming blades having extension ends which are located within the tread forming surface section of each sector and being disposed at predetermined intervals along the circumferential direction of the side mold section, wherein the sipe forming blades comprise first sipe forming blades located in the sector divisional position vicinity regions and second sipe forming blades in the sector divisional position distant regions, each first sipe forming blade including side surfaces on both sides thereof and an extension end surface extending between the side surfaces, corners being defined between the extension end surface and the side surfaces, at least one of the corners located on the remote side of the first sipe forming blade from a sector divisional position in a sector divisional position vicinity region where the first sipe forming blade is located being chamfered.

As described above, at least one corner of each first sipe forming blade located on the remote side of the first sipe forming blade from the sector divisional position is chamfered, and at least one edge portion of each first sipe located on the remote side of the first sipe from the position in the first region of the tread surface conforming to the sector divisional position has a shape to be chamfered, thereby facilitating removal of the extension side end portions of the first sipe forming blades. Therefore, cracking of parts of the land around the extension end portions of the first sipes can be inhibited.

The present invention provides still another pneumatic tire which is cured and molded by a sectional type tire mold including an annular side mold section having a tread forming surface for forming a tread surface, the side mold section comprising a plurality of sectors into which the side mold section is divided along a circumferential direction of the side mold section, the tread forming surface of the side mold section having sector divisional position vicinity regions including sector divisional positions and sector divisional position distant regions located therebetween, the pneumatic tire having a tread surface which includes first regions formed by the sector divisional position vicinity regions and second regions formed by the sector divisional position distant regions, the tread surface having lands defined by at least one circumferential groove which extends in a circumferential direction of the tire, sipes which extend from the at least one circumferential groove into at least one of the lands with their extension ends located within the at least one land being disposed at predetermined intervals along the tire circumferential direction, wherein the sipes comprise first sipes in the first regions and second sipes in the second regions, the at least one land having a groove side wall surface facing to the at least one circumferential groove and sipe side wall surfaces located on both sides of each first sipe, each first sipe having a sipe open part which is open to the groove side wall surface, sipe open end portions which face to the sipe open part being defined between the groove side wall surface and the sipe side wall surfaces, at least one of the sipe open end portions located on the remote side of the first sipe from a position in a first region of the tread surface where the first sipe is located being chamfered, the position in a first region of the tread surface conforming to one of the sector divisional positions.

Still another tire mold according to the present invention includes an annular side mold section having a tread forming surface for forming a tread surface of a tire, the side mold section comprising a plurality of sectors into which the side mold section is divided along a circumferential direction of the side mold section, the tread forming surface of the side mold section having sector divisional position vicinity regions including sector divisional positions and sector divisional position distant regions located therebetween, each sector including a tread firming surface section, at least one circumferential groove forming ridge which extends in a circumferential direction of the side mold section and sipe forming blades which are connected to at least one side surface of the at least one circumferential groove forming ridge and extend from the at least one side surface of the at least one circumferential groove forming ridge in a widthwise direction of the side mold section protruding on the tread forming surface section of each sector, the sipe forming blades having extension ends which are located within the tread forming surface section of each sector and being disposed at predetermined intervals along the circumferential direction of the side mold section, wherein the sipe forming blades comprise first sipe forming blades located in the sector divisional position vicinity regions and second sipe forming blades in the sector divisional position distant regions, each first sipe forming blade having side surfaces on both sides thereof connected to the at least one side surface of the at least one circumferential groove forming ridge, corners being defined between the at least one side surface of the at least one circumferential groove forming ridge and the side surfaces on the both sides of the first sipe forming blade, at least one of the corners located on the remote side of the first sipe forming blade from a sector divisional position in a sector divisional position vicinity region where the first sipe forming blade is located being arranged so as to have a filled structure.

As described above, at least one corner of each first sipe forming blade located on the remote side of the first sipe forming blade from the sector divisional position is arranged so as to have a filled structure, and at least one sipe open end portion located on the remote side of the first sipe from the position in the first region of the tread surface conforming to the sector divisional position, thereby facilitating removal of the connection sides of the first sipe forming blades. Therefore, chipping of the sipe open end portions can be suppressed.

DESCRIPTION OF THE PREFERRED EMBODIMENTS

Embodiments of the present invention will be described in detail below with reference to the drawings.

Figure 1:
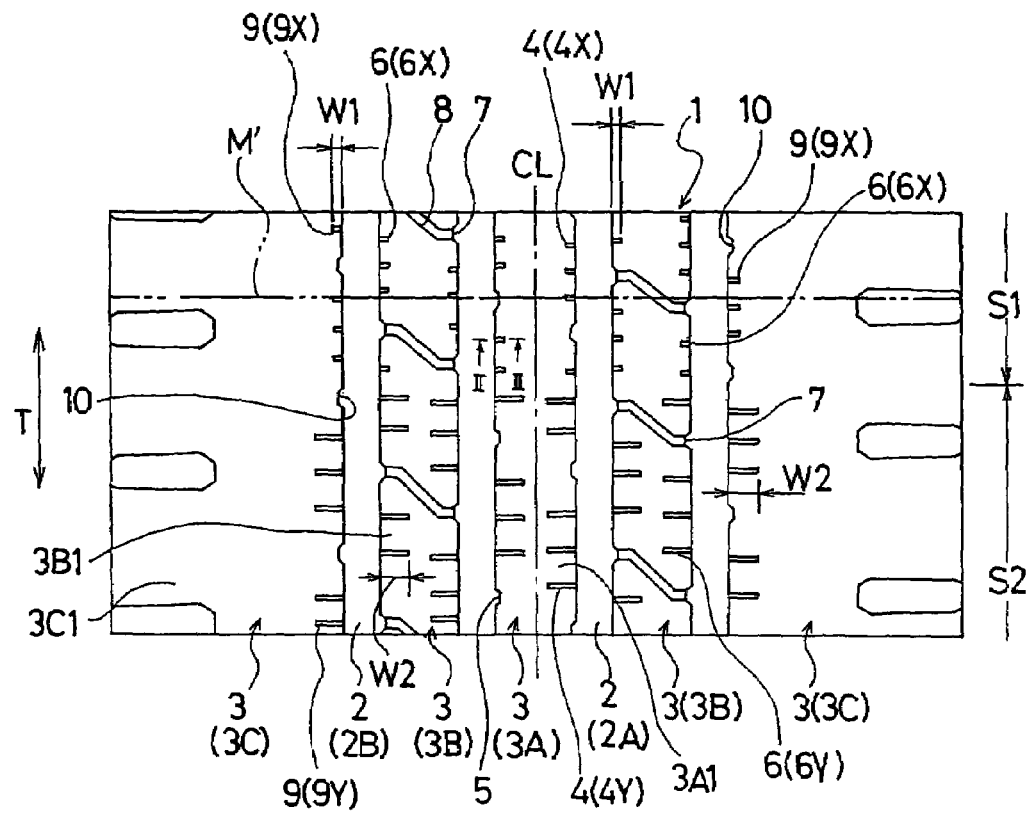
FIG. 1 is a partial development view of a tread surface showing an embodiment of a pneumatic tire according to the present invention.

Referring to FIG. 1, there is shown an embodiment of a pneumatic tire according to the present invention, and a tread surface 1 includes a plurality (four in the drawing as illustrative) of circumferential grooves 2 which extend along a circumferential direction T of the tire; a plurality of lands 3 comprising ribs which extend in the tire circumferential direction T are defined by the circumferential grooves 2.

The plurality of circumferential grooves 2 comprise two inner circumferential grooves 2A disposed on both sides of the tire centerline CL, and two outer circumferential grooves 2B disposed outwardly of the inner circumferential grooves. The plurality of lands 3 comprise a center land 3A formed between the two inner circumferential grooves 2A and located on the tire centerline CL, intermediate lands 3B formed between the inner circumferential grooves 2A and the outer circumferential grooves 2B, and outer lands 3C formed outwardly of the outer circumferential grooves 2B.

The center land 3A, intermediate lands 3B and outer lands 3C include ground contacting surface 3A1, 3B1 and 3C1 which engage a road surface, respectively. The ground contacting surface 3A1 of the center land 3A has sipes 4 extending straight in a widthwise direction of the tire on both sides of the center land 3A; the sipes 4 are disposed at predetermined intervals in the tire circumferential direction T with lug grooves 5 interposed between the sipes 4. Each sipe 4 extends from an inner circumferential groove 2 into the center land 3A, and only one end thereof is communicatingly connected to the inner circumferential groove 2A; the other end thereof is located within the center land 3A.

The ground contacting surface 3B1 of each of the intermediate lands 3B also has sipes 6 extending straight in the tire widthwise direction on both sides of the intermediate land 3B; the sipes 6 are disposed at predetermined intervals in the tire circumferential direction T with lug grooves 7 interposed between the sipes 6. Sipes 6 located axially inwardly of the tire axis extend from the inner circumferential grooves 2A into the intermediate lands 3B; only one ends thereof are communicatingly connected to the inner circumferential grooves 2A; the other ends thereof are located within the intermediate lands 3B. Sipes 6 located axially outwardly of the tire axis extend from the outer circumferential grooves 2B into the intermediate lands 3B; only one ends thereof are communicatingly connected to the outer circumferential grooves 2B; the other ends thereof are located within the intermediate lands 3B. Sipes 8 are provided between the lug grooves 7 on both sides of each intermediate land 3B.

The ground contacting surface 3C1 of each of the outer lands 3C also has sipes 9 extending straight in the tire widthwise direction; the sipes 9 are disposed at predetermined intervals in the tire circumferential direction T with lug grooves 10 interposed between the sipes 9. The sipes 9 extend from the outer circumferential grooves 2B into the outer lands 3C; only one ends thereof are communicatingly connected to the outer circumferential grooves 2B; the other ends thereof are located within the outer lands 3C. The sipes 4, 6 and 9 are substantially equal in depth.

The sipes 4, 6 and 9 comprise first sipes 4X, 6X and 9X, respectively, located in first regions S1 and second sipes 4Y, 6Y and 9Y located in second regions S2 between the first regions S1; each of the first regions S1 ranges between positions each of which are 20 mm, preferably 40 mm away from a position M' on the tread surface 1 to each side of the tire circumferential direction; the position M' conforms to one of sector divisional positions M of a sectional type tire mold described later.

The first regions S1 are regions of the tread surface 1 formed by sector divisional position vicinity regions of a tread forming surface of a side mold section described later, and the second regions S2 ate regions of the tread surface 1 formed by sector divisional position distant regions of the tread forming surface of the side mold section.

The first sipes 4X, 6X and 9X each have a tire widthwise direction length W1 which is defined by a length measured along the tire widthwise direction (tire axial direction), and the second sipes 4Y, 6Y and 9Y each have a tire widthwise direction length W2 which is defined by a length measured in the same manner, the tire widthwise direction lengths W1 of the first sipes 4X, 6X and 9X being less than the tire widthwise direction lengths W2 of the second sipes 4Y, 6Y and 9Y.

The tire widthwise direction lengths W1 of the first sipes 4X, 6X and 9X are preferably in the range expressed by $W1 \leq 0.70 \times W2$. If the tire widthwise direction lengths W1 of the first sipes 4X, 6X and 9X are greater than $0.70 \times W2$, it is difficult to effectively inhibit the lands from chipping and cracking. The tire widthwise direction lengths W1 of the first sipes 4X, 6X and 9X are more preferably in the range expressed by $W1 \leq 0.30 \times W2$. The lower limits of the tire widthwise direction lengths W1 of the first sipes 4X, 6X and 9X are preferably equal to or more than $0.15 \times W2$ in order to provide a sipe function.

Figure 2:
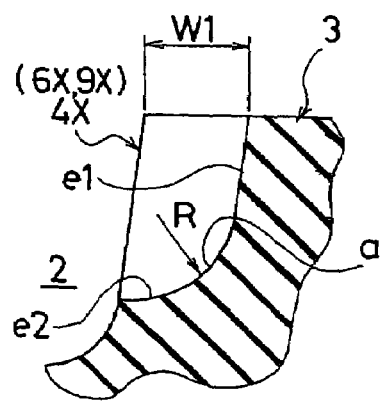
FIG. 2 is a partial enlarged cross-sectional view taken along line II-II of FIG. 1.

As shown in FIG. 2, the lands 3 have sipe extension end wall surfaces e1 located at extension ends of the first sipes 4X, 6X and 9X and sipe bottom surfaces e2 located at bottoms of the first sipes 4X, 6X and 9X. The sipe extension end wall surfaces e1 and the sipe bottom surfaces e2 are connected via curved surfaces a in the form of circular arcs in cross section having a radius R (mm).

The radius R of each curved surface a is preferably in the range expressed by $0.8 \times w1 \leq R \leq 1.5 \times W1$. If the radius R is less than $0.8 \times w1$, it is apt to crack in the curved surface a. Also if the radius R is greater than $1.5 \times W1$, cracking is apt to occur in the curved surface a.

Sipe bottom surfaces located at the bottoms of the second sipes 4Y, 6Y and 9Y, and sipe extension end wall surfaces at extension ends thereof may also be connected via curved surfaces in the form of circular arcs in cross section having a predetermined radius.

Figure 3:
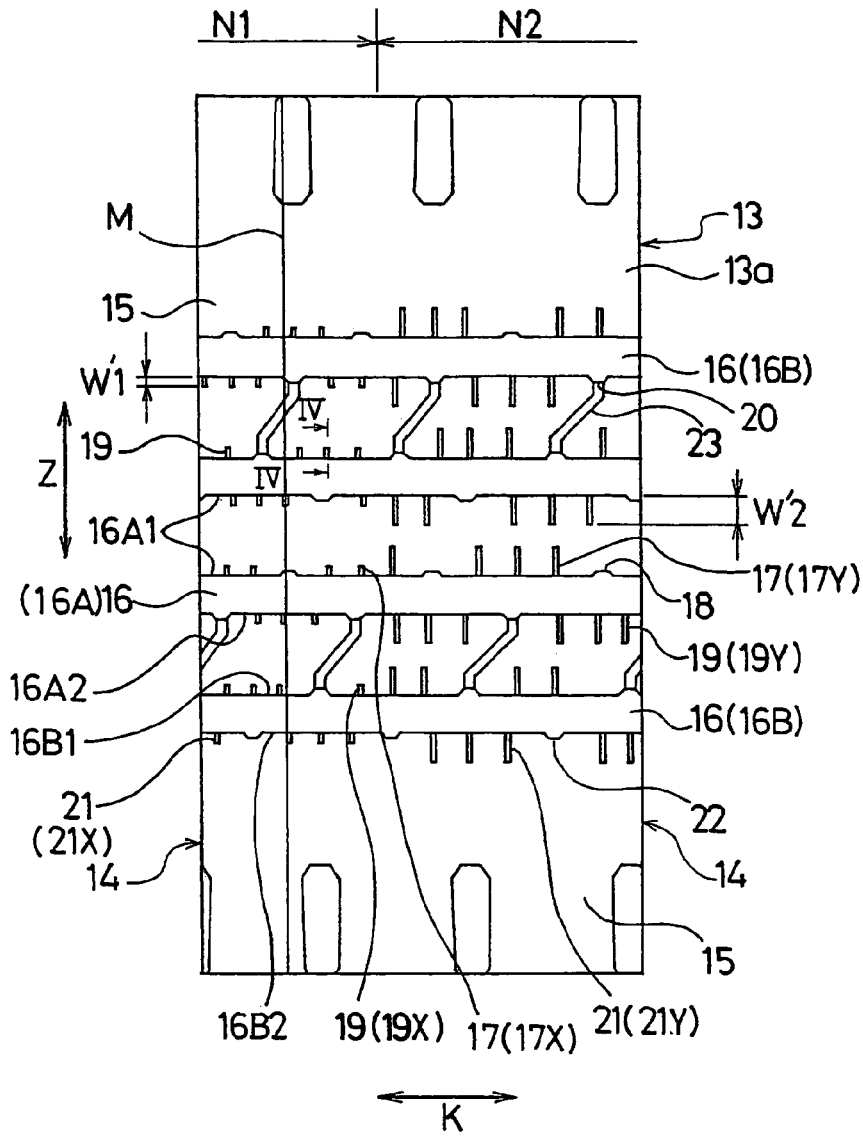
FIG. 3 is a partial development view of a side mold section of a tire mold used for curing and molding the pneumatic tire shown in FIG. 1.

In FIG. 3, there is shown a part of a sectional type tire mold used for curing and molding the above-mentioned pneumatic tire. Reference numeral 13 denotes an annular side mold section (a part of it is shown in the drawing) which is disposed between an upper mold section (not shown) for forming one sidewall surface of the tire and a lower mold section (not shown) for forming the other sidewall surface of the tire and has a tread forming surface 13a for forming the tread surface 1. The side mold section 13 consists of a plurality (generally 7 to 11) of sectors 14 into which the side mold section 13 is divided along a circumferential direction K thereof. The tread forming surface 13a of the side mold section 13 has sector divisional position vicinity regions N1 including a sector divisional position M, and sector divisional position distant regions N2 therebetween, the sector divisional position vicinity regions N1 and the sector divisional position distant regions N2 being alternately arranged. Each of the sector divisional position vicinity regions N1 ranges between positions each of which are 20 mm, preferably 40 mm away from the divisional position M of each sector 14 to each side of the circumferential direction of the side mold section.

Each sector 14 has a tread forming surface section 15 for forming each part of the tread surface 1. A plurality (four in the drawing as illustrative) of circumferential groove forming ridges 16 for forming the circumferential grooves 2 protrude on the tread forming surface section 15 of each sector 14 at predetermined intervals along a widthwise direction Z of the side mold section. The plurality of circumferential groove forming ridges 16 extend along the circumferential direction K of the side mold section, and comprises two inner circumferential groove forming ridges 16A for forming the inner circumferential grooves 2A and two outer circumferential groove forming ridges 16B for forming the inner circumferential grooves 2B.

A plurality of sipe forming blades 17 for forming sipes 4 and a plurality of lug groove forming protrusions 18 for froming the lug grooves 5, which are connected to a side mold section widthwise direction inner side surface 16A1 of each inner circumferential groove forming ridge 16A, protrude on the tread forming surface section 15 of each sector 14. The sipe forming blades 17 are connected at only one ends thereof to the inner side surface 16A1 of each inner circumferential groove forming ridge 16A and extend inwardly of the widthwise direction of the side mold section from the inner side surface 16A1. The plurality of sipe forming blades 17 are provided at predetermined intervals along the widthwise direction K of the side mold section with the lug groove forming protrusions 18 interposed therebetween.

A plurality of sipe forming blades 19 for forming the sipes 6 and a plurality of lug groove forming protrusions 20 for forming the lug grooves 7, which are connected to a side mold section widthwise direction outer side surface 16A2 of each inner circumferential groove forming ridge 16A or a side mold section widthwise direction inner side surface 16B1 of each outer circumferential groove forming ridge 16B, protrude on the tread forming surface section 15 of each sector 14. Sipe forming blades 19 connected to the side mold section widthwise direction outer side surface 16A2 of each inner circumferential groove forming ridge 16A are connected at only one ends thereof to the outer side surface 16A2 of each inner circumferential groove forming ridge 16A and extend outwardly of the widthwise direction of the side mold section from the outer side surface 16A2. Sipe forming blades 19 connected to the side mold section widthwise direction inner side surface 16B1 of each outer circumferential groove forming ridge 16B are connected at only one ends thereof to the inner side surface 16B1 of each outer circumferential groove forming ridge 16B and extend inwardly of the widthwise direction of the side mold section from the inner side surface 16B1. The plurality of sipe forming blades 19 are provided at predetermined intervals along the width direction K of the side mold section with the lug groove forming protrusions 20 interposed therebetween.

A plurality of sipe forming blades 21 for forming the sipes 9 and a plurality of lug groove forming protrusions 22 for forming the lug grooves 10, which are connected to a side mold section widthwise direction outer side surface 16B2 of each outer circumferential groove forming ridge 16B, protrude on the tread forming surface section 15 of each sector 14. The sipe forming blades 21 are connected at only one ends thereof to the outer side surface 16B2 of each outer circumferential groove forming ridge 16B and extend outwardly of the widthwise direction of the side mold section from the outer side surface 16B2. The plurality of sipe forming blades 21 are provided at predetermined intervals along the widthwise direction K of the side mold section with the lug groove forming protrusions 22 interposed therebetween. The sipe forming blades 17, 19 and 21 are substantially equal in height.

Sipe forming blades 23 for forming the sipes 8 are provided between lug groove forming protrusions 20 connected to the side mold section widthwise direction outer side surfaces 16A2 of the inner circumferential groove forming ridges 16A, and lug groove forming protrusions 20 connected to the side mold section widthwise direction inner side surfaces 16B1 of the outer circumferential groove forming ridges 16B.

The sipe forming blades 17, 19 and 21 comprise first sipe forming blades 17X, 19X and 21X located in the sector divisional position vicinity regions N1, and second sipe forming blades 17Y, 19Y and 21Y located in the sector divisional position distant regions N2, respectively.

The first sipe forming blades 17X, 19X and 21X each have a side mold section widthwise direction length W'1 which is defined by a length measured along the widthwise direction of the side mold section, and the second sipe forming blades 17Y, 19Y and 21Y each have a side mold section widthwise direction length W'2 which is defined by a length measured in the same manner, the side mold section widthwise direction lengths W'1 of the first sipe forming blades 17X, 19X and 21X being less than the side mold section widthwise direction lengths W'2 of the second sipe forming blades 17Y, 19Y and 21Y.

The side mold section widthwise direction lengths W'1 of the first sipe forming blades 17X, 19X and 21X are preferably in the range expressed by $W'1 \leq 0.70 \times W'2$. If the side mold section widthwise direction lengths W'1 of the first sipe forming blades 17X, 19X and 21X are greater than $0.70 \times W'2$, it is difficult to effectively inhibit the lands from chipping and cracking. The side mold section widthwise direction lengths W'1 of the first sipe forming blades 17X, 19X and 21X are more preferably in the range expressed by $W'1 \leq 0.30 \times W'2$. The lower limits of the side mold section widthwise direction lengths W'1 of the first sipe forming blades 17X, 19X and 21X are preferably equal to or more than $0.15 \times W'2$ in order to provide a sipe function.

Figure 4:
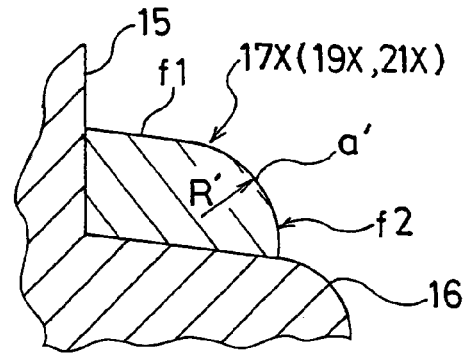
FIG. 4 is a partial enlarged cross-sectional view taken along line IV-IV of FIG. 3.

The first sipe forming blades 17X, 19X and 21X which extend from the circumferential groove forming ridges 16 in the widthwise direction of the side mold section and protrude on the tread forming surface sections 15 of the sectors 14 have, as shown in FIG. 4, extension end surfaces f1 and top surfaces f2 connected thereto. Corners defined between the extension end surfaces f1 and the top surfaces f2 are formed to have curved surfaces a' in the form of circular arcs in cross section having a radius R' (mm). The radius R' of each curved surface a' is preferably in the range expressed by 0.8×w'1≦R'≦1.5×W'1. If the radius R' is less than 0.8×w'1, or is greater than 1.5×W1, cracking is apt to occur in the curved surface a connecting the sipe extension end wall surface e1 and the sipe bottom surface e2.

In the same way, the second sipe forming blades 17Y, 19Y and 21Y may also have corners between their extension end surfaces and bottom surfaces which are formed to have curved surfaces in the form of circular arcs in cross section having a predetermined radius.

Figure 5:
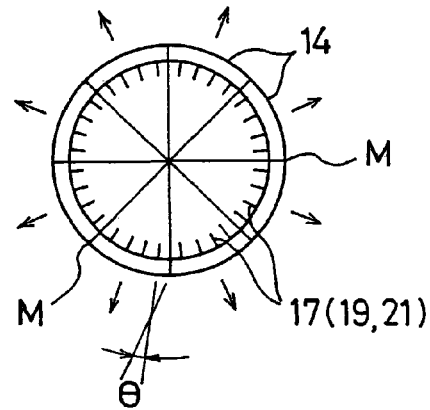
FIG. 5 is a view for illustrating an operation of the tire mold of FIG. 3.

A sectional type tire mold is operated such that, after a pneumatic tire has been cured, as shown in FIG. 5, annularly placed sectors 14 are retracted radially outward as shown by arrows to remove the sectors. Angles θ between the protrusion directions of the sipe froming blades 17, 19 and 21 and the retracting directions of the sectors 14 located nearer to the divisional positions Mare greater from the centers of the sectors 14, and the angles are in the maximum ranges in the sector divisional position vicinity regions N1. Therefore, large external forces act upon lands 3 of the cured tire in the sector divisional position vicinity regions N1 by the sipe forming blades 17, 19 and 21 that are removed, which causes the lands 3 to chip and crack.

In view of this, according to the present invention, the side mold section widthwise direction lengths W'1 of the first sipe forming blades 17X, 19X and 21X located in the sector divisional position vicinity regions N1 are less than the side mold section widthwise direction lengths W'2 of the second sipe forming blades 17Y, 19Y and 21Y located in the sector divisional position distant regions N2, and the tire widthwise direction lengths W1 of the first sipes 4X, 6X and 9X are less than the tire widthwise direction lengths W2 of the second sipes 4Y, 6Y and 9Y.

Thus when the first sipe forming blades 17X, 19X and 21X located in the sector divisional position vicinity regions N1 are removed, large external forces acting upon the lands 3 are avoided, thereby facilitating removal of the first sipe forming blades 17X, 19X and 21X. Therefore, chipping of edge portions of the lands 3 facing to the first sipes 4X, 6X and 9X and circumferential grooves 2, and cracking of corners of the lands 3 facing to the first sipes 4X, 6X and 9X can be suppressed.

Figure 6:
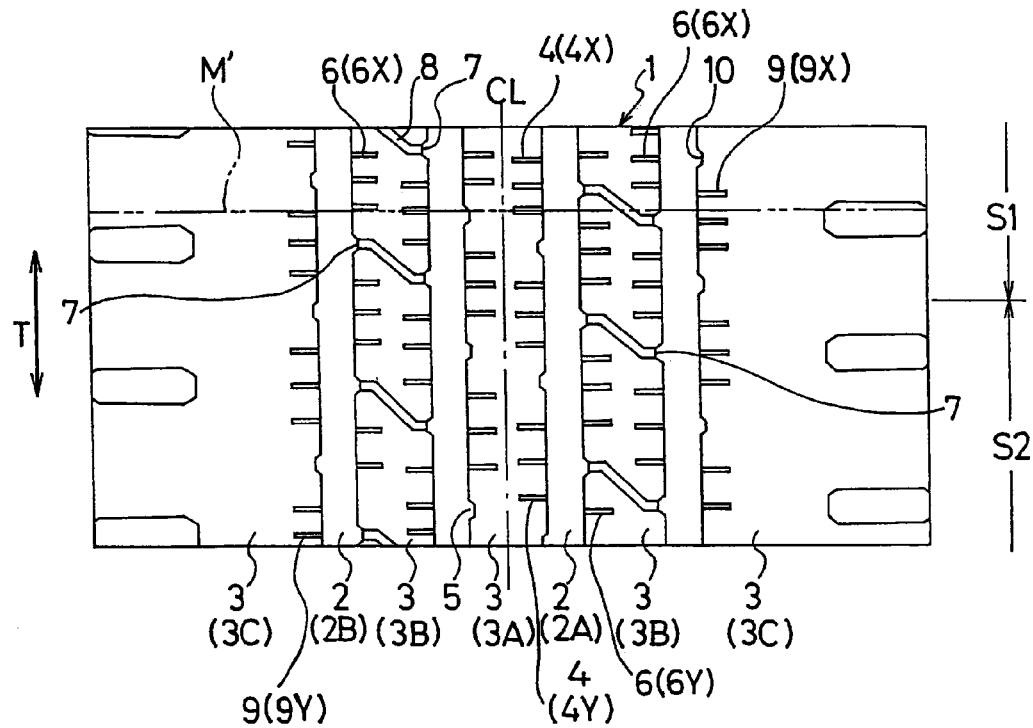
FIG. 6 is a partial development view of a tread surface showing another embodiment of a pneumatic tire according to the present invention.
Figure 7:
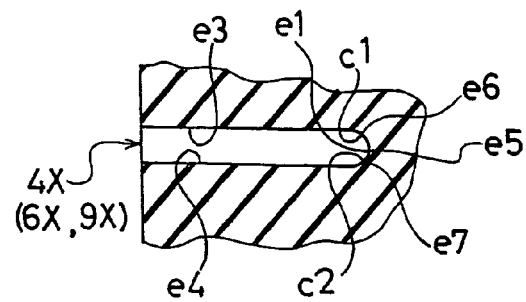
FIG. 7 is an enlarged cross-sectional view of a first sipe taken along a plane perpendicular to a radial direction of the tire at which it is located.

Referring to FIG. 6, there is shown another embodiment of a pneumatic tire according to the present invention, and this pneumatic tire of FIG. 6 is arranged in the pneumatic tire of FIG. 1 so that the first sipes 4X, 6X and 9X located in the first regions S1 are formed as shown in FIG. 7 instead of making the tire widthwise direction length W1 thereof shorter. Other structures are the same as those of the pneumatic tire of FIG. 1, the same structural elements as those in FIG. 1 are referred by the same reference characters and description of these elements will be omitted.

In FIG. 7, reference character e1 denotes a sipe extension end wall surface located at the extension end of the first sipe 4X, 6X, 9X, reference character e3 denotes a sipe side wall surface located on one side of the first sipe 4X, 6X, 9X, and reference character e4 denotes a sipe side wall surface located on the other side of the first sipe 4X, 6X, 9X.

Defined between the sipe extension end wall surface e1 and sipe side wall surfaces e3 and e4 are corners c1 and c2, which are formed to have curved surfaces in the form of circular arcs in cross section taken along a plane perpendicular to a radial direction of the tire at which the first sipe is located. Thus, as shown in FIG. 7, each first sipe 4X, 6X, 9X has an extension end e5 with no edges on both sides thereof, and edge portions e6 and e7 on both sides of the extension end e5 have a shape formed so as to be chamfered in the form of a circular arc in cross section. The first sipes 4X, 6X and 9X have tire widthwise direction lengths equal to the tire widthwise direction lengths of the second sipes 4Y, 6Y and 9Y.

Figure 8:
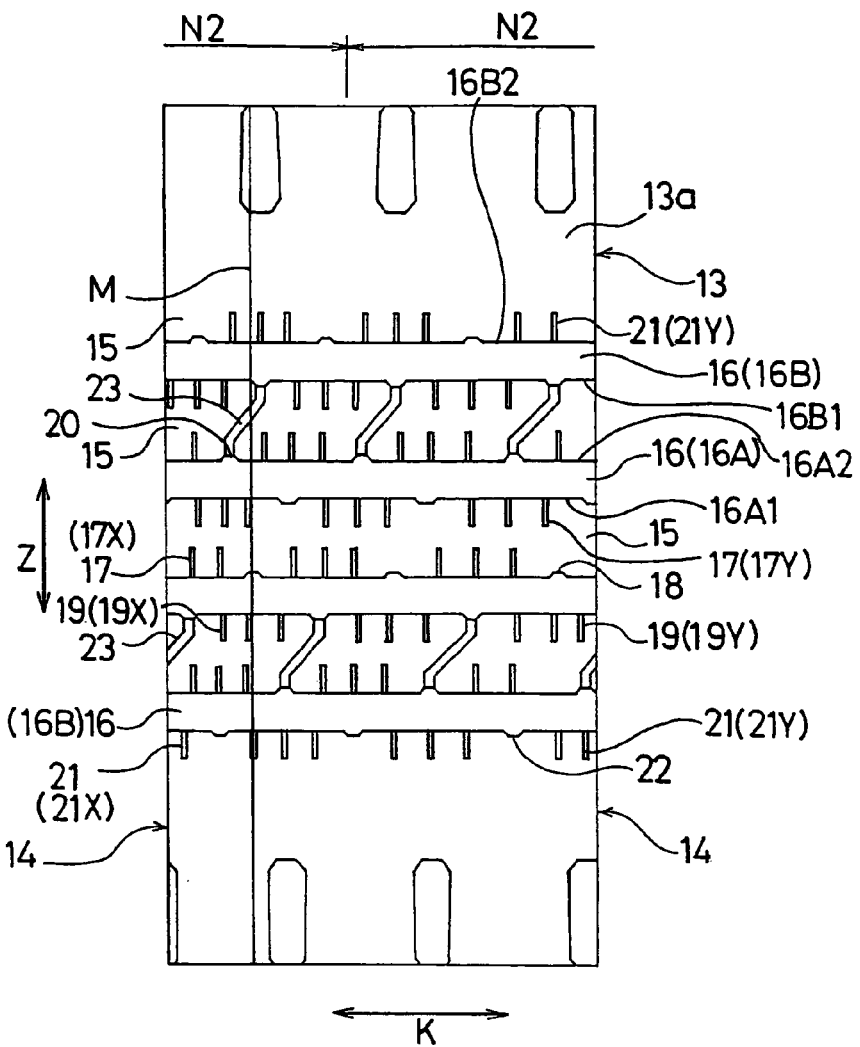
FIG. 8 is a partial development view of a side mold section of a tire mold used for curing and molding the pneumatic tire shown in FIG. 6.
Figure 9:
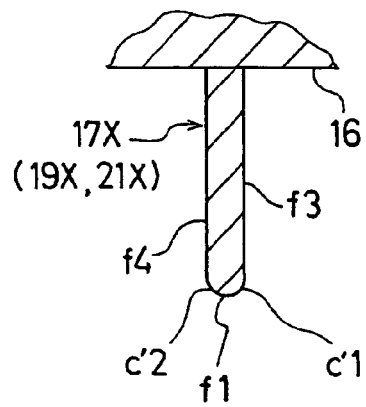
FIG. 9 is an enlarged cross-sectional view of a first sipe forming blade taken along a plane perpendicular to a radial direction of the side mold section at which it is located.

In FIG. 8, there is shown a part of a sectional type tire mold used for curing and molding the above-mentioned pneumatic tire of FIG. 6. This tire mold of FIG. 8 is arranged in the above-mentioned tire mold of FIG. 3 so that the first sipe forming blades 17X, 19X and 21X located in the sector divisional position vicinity regions N1 are formed as shown in FIG. 9 instead of making the side mold section widthwise direction length W'1 thereof shorter. Other structures are the same as those of the tire mold of FIG. 3, the same structural elements as those in FIG. 3 are referred by the same reference characters and description of these elements will be omitted.

In FIG. 9, reference character f1 denotes an extension end surface of the first sipe forming blade 17X, 19X, 21X, reference character f3 denotes a side surface on one side of the first sipe forming blade 17X, 19X, 21X, and reference character f4 denotes a side surface on the other side of the first sipe forming blade 17X, 19X, 21X.

Defined between the extension end surface f1 and side surfaces f3 and f4 of each first sipe forming blade are corners c'1 and c'2, which are chamfered to have curved surfaces in the form of circular arcs in cross section taken along a plane perpendicular to a radial direction of the side mold section at which it is located. The first sipe forming blades 17X, 19X and 21X have side mold section widthwise direction lengths equal to the side mold section widthwise direction lengths of the second sipe forming blades 17Y, 19Y and 21Y.

This structure employed facilitates removing extension side end portions of the first sipe forming blades 17X, 19X and 21X located in the sector divisional position vicinity regions N1, and cracking can therefore be suppressed in the part of each land located on the extension end side of each first sipe 4X, 6X, 9X.

It is preferable that, as shown in FIG. 9, the corners c'1 and c'2 on both sides of the extension end surface f1 of each first sipe forming blade 17X, 19X, 21X be chamfered and that, as shown in FIG. 7, edge portions e6 and e7 on both sides of the extension end e5 of each first sipe 4X, 6X, 9X have a shape formed so as to be chamfered in the form of a circular arc in cross section; however, cracking is apt to occur especially in parts of the lands facing to the edge portions e6 which are located on the remote sides of the first sipes 4X, 6, 9x from positions M' in the first regions S1 of the tread surface 1 where the first sipes are located, conforming to the divisional positions M; therefore, at least the corner c'1 of each first sipe forming blade 17X, 19X, 21X located on the remote side thereof from a sector divisional position M in a sector divisional position vicinity region N1 where the first sipe forming blade is located may be chamfered, and each edge portion e6 on the remote side of each first sipe 4X, 6, 9x from a position M' in a first region S1 of the tread surface 1 where the first sipe is located, conforming to one of the divisional positions M may have a shape formed so as to be chamfered.

In the embodiment shown in FIG. 8, the second sipe forming blades 17Y, 19Y and 21Y located in the sector divisional position distant regions N2 may also have the same structures as the first sipe forming blades 17X, 19X and 21X with the corners c'1 and c'2 which are chamfered, and in the embodiment shown in FIG. 6, the second sipes 4Y, 6Y and 9Y may also have the same structures as the first sipes 4X, 6X and 9Y with the edge portions e6 and e7 having a shape formed so as to be chamfered as shown in FIG. 7.

Figure 10:
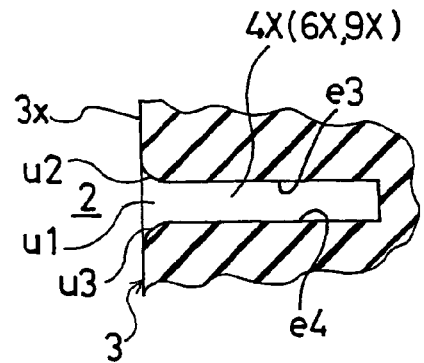
FIG. 10 is an enlarged cross-sectional view of a first sipe used for still another embodiment of a pneumatic tire according to the present invention, taken along a plane perpendicular to a radial direction of the tire at which it is located.

Referring to FIG. 10, there is shown one of the first sipes used for still another embodiment of a pneumatic tire according to the present invention. The still another embodiment of the pneumatic tire of the present invention is arranged in the pneumatic tire shown in FIG. 6 so that each first sipe 4X, 6X, 9X is formed as shown in FIG. 10 instead of making the edge portions e6 and e7 thereof which have a shape formed so as to be chamfered.

In FIG. 10, reference character 3x denotes one groove side wall surface of the land 3 facing to the circumferential groove 2, reference character u1 denotes an open part of the first sipe 4X, 6X and 9X which is open to the groove side wall surface 3x, u2 and u3 denote sipe open end portions formed between the groove side wall surface 3x and sipe side wall surfaces e3 and e4 and facing to the sipe open part u1. The sipe open end portions u2 and u3 facing to each first sipe 4X, 6X, 9X are chamfered to have curved surfaces in the form of circular arcs in cross section taken along a plane perpendicular to a radial direction of the tire at which it is located.

Figure 11:
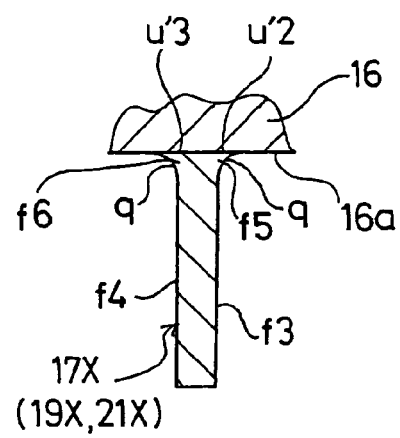
FIG. 11 is an enlarged cross-sectional view of a first sipe forming blade employed for a tire mold used for curing and molding a pneumatic tire having first sipes one of which is shown in FIG. 10, taken along a plane perpendicular to a radial direction of the side mold section at which it is located.

In FIG. 11, there is shown one of the first sipe forming blades of a sectional type tire mold used for curing and molding a pneumatic tire having the above-mentioned first sipes 4X, 6X and 9X one of which is shown in FIG. 10. The tire mold shown in FIG. 8 may have first sipe forming blades one of which is shown in FIG. 11 instead of the first sipe forming blades one of which is shown in FIG. 9.

The first sipe forming blade 17X, 19X, 21X of FIG. 11 has a thickness which is gradually greater in a connection side thereof which is connected to a side surface 16a of the circumferential groove forming ridge 16, and corners u'2 and u'3 defined between the side surface 16a of the circumferential groove forming ridge 16 and the side surfaces f3 and f4 of the first sipe forming blade 17X, 19X, 21X are formed to be filled with thick portions f5 and f6 of the first sipe forming blade 17X, 19X, 21X so that the corners u'2 and u'3 each have a curved surface q in the form of a circular arc in cross section taken along a plane perpendicular to a radial direction of the tire at which it is located.

This structure employed facilitates removing the connection sides the first sipe forming blades 17X, 19X and 21X with the circumferential groove forming rdges 16 located in the sector divisional position vicinity regions N1, and chipping of the sipe open end portions u2 and u3 can therefore be inhibited.

It is preferable that, as shown in FIG. 11, the corners u'2 and u'3 have a filled structure and that, as shown in FIG. 10, the sipe open end portions u2 and u3 be formed to be chamfered; however, chipping is apt to occur especially in the sipe open end portions u2 which are located on the remote sides of the first sipes 4X, 6X and 9x from positions M' in the first regions S1 of the tread surface 1 where the first sipes are located, conforming to the divisional positions M; therefore, at least the corner u'2 of each first sipe forming blade 17X, 19X, 21X located on the remote side thereof from a sector divisional position M in a sector divisional position vicinity region N1 where the first sipe forming blade is located may have a filled structure, and each sipe open end portion u2 on the remote side of each first sipe 4X, 6X, 9X from a position M' in a first region S1 of the tread surface 1 where the first sipe is located, conforming to one of the divisional positions M may be formed to be chamfered.

In the tire mold having first sipe forming blades one of which is shown in FIG. 11, the second sipe forming blades 17Y, 19Y and 21Y located in the sector divisional position distant regions N2 may also have the same structures as the first sipe forming blades 17X, 19X and 21X with the corners u'2 and u'3 having a filled structure, and in the pneumatic tire having first sipes one of which is shown in FIG. 10, sipe open end portions facing to sipe open parts of the second sipes 4Y, 6Y and 9Y may also have the same structures as the sipe open end portions u2 and u3 which are chamfered.

The structure shown in FIG. 10 is also preferably employed for sipes both ends of which are open to circumferential grooves.

In the present invention, the above-mentioned sipes 4, 6 and 9 each may have a width of about 0.4 mm to about 2 mm, and a depth of about 3 mm to about 15 mm. The sipe forming blades 17, 19 and 21 each may have a thickness of about 0.4 mm to about 2 mm, and a height of about 3 mm to about 15 mm.

The tire widthwise direction lengths W2 of the second sipes 4Y, 6Y and 9Y, and the side mold section widthwise direction lengths W'2 of the second sipe forming blades 17Y, 19Y and 21Y may be 1.5 mm to 12 mm, respectively.

Figure 12:
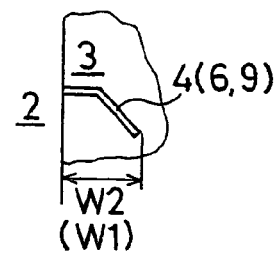
FIG. 12 is an enlarged plan view showing an example of one of another sipes.

The sipes 4, 6 and 9 exemplified in the above embodiments extend straight along the tire widthwise direction, but are not limited thereto. For example, sipes 4, 6 and 9 which bend as shown in FIG. 12 may be employed.

In case where pneumatic tires have sipes disposed in regions corresponding to a vicinity region of the boundary position between an upper mold section (not shown) and a side mold section 13, and a vicinity region of the boundary position between a lower mold section (not shown) and the side mold section 13, the sipes located in the corresponding regions may have a tire widthwise direction length greater than that of the sipes located in the other region.

Exemplified in the above embodiments are pneumatic tires including a tread pattern having lands 3 which consist of ribs, but the present invention may include pneumatic tires with a tread pattern having lands which consists of blocks or a combination of ribs and blocks, and is applicable to any of pneumatic tires having a tread surface which includes first regions formed by sector divisional position vicinity regions of a side mold section and second regions formed by sector divisional position distant regions thereof, the tread surface having lands defined by at least one circumferential groove which extends in a circumferential direction of the tire, sipes which extend from the at least one circumferential groove into at least one of the lands with their extension ends located within the at least one land being disposed at predetermined intervals along the tire circumferential direction, the sipes comprising first sipes in the first regions and second sipes in the second regions.

In the present invention, the structures shown in the embodiments described above may properly combine with each other, thereby allowing for further improvement of chipping and cracking in the lands 3.

EXAMPLE

Ten tires according to the present invention tires 1 and 2, and the prior art tire were obtained, respectively, having a tire size of 145R126PRLT, by curing and molding, using sectional type tire molds; the present invention tire 1 had an arrangement shown in FIG. 1 that had first sipes in the first regions S1 which were shorter in tire widthwise direction length than second sipes in the second regions S2; the present invention tire 2 had an arrangement shown in FIG. 6 in which each sipe open end portion located on the remote side of each first sipe from a position M' in a first region of the tread surface where the first sipe is located, conforming to one of the sector divisional positions M were chamfered, and the edge portion of each first sipe located on the remote side of the first sipe from a position M' in a first region of the tread surface where the first sipe is located, conforming to one of the sector divisional positions M had a shape to be chamfered; the prior art tire had the same arrangement as the present invention tire 1 except that all the sipes were equal in tire widthwise direction length.

Rubber having a low breaking elongation (300%) was used for a rubber layer constituting the tread surface of each test tire to facilitate chipping for convenient evaluation.

In each test tire that had been cured and molded, the chipping/cracking state due to the sipes was visually inspected, and the evaluation was made by three levels shown below according to the numbers of chippings and cracks that had occurred. The evaluation results were shown in Table 1.

TABLE 1

|  | Prior Art Tire | Prevent Invention Tire 1 | Present Invention Tire 2 |
| --- | --- | --- | --- |
| Chipping/ Cracking | 3 | 1 | 2 |

1: the numbers of occurrence are 0 to 5.
2: the numbers of occurrence are 6 to 10.
3: the numbers of occurrence are 11 or more.

As can be seen from Table 1, the tires according to the present invention can improve chipping and cracking.

What is claimed is:

1. A pneumatic tire which is cured and molded by a sectional type tire mold including an annular side mold section having a tread forming surface for forming a tread surface, the side mold section comprising a plurality of sectors into which the side mold section is divided along a circumferential direction of the side mold section, the tread forming surface of the side mold section having sector divisional position vicinity regions including sector divisional positions and sector divisional position distant regions located therebetween, the pneumatic tire having a tread surface which includes first regions formed by the sector divisional position vicinity regions, where the first regions extend along an entire axial width of the tread surface, and second regions formed by the sector divisional position distant regions, where the second regions extend along the entire axial width of the tread surface, the tread surface having lands defined by at least one circumferential groove which extends in a circumferential direction of the tire, sipes which extend from the at least one circumferential groove into at least one of the lands with their extension ends located within the at least one land being disposed at predetermined intervals along the tire circumferential direction, wherein the sipes comprise first sipes and second sipes, and each first sipe has a tire widthwise direction length W1 that is less than the tire widthwise direction length W2 of each second sipe, wherein the first sipes are disposed only in the first regions, and the second sipes are disposed only in the second regions, and further wherein said first region and said second region are alternately arranged in the circumferential direction of the tire, the first region being a region located between a position on the tread surface corresponding to the sector divisional position and a position ranging from 20 to 40 mm from said position corresponding to the sector divisional position on each side thereof in the circumferential direction of the tire.

2. A pneumatic tire according to claim 1, wherein the tire widthwise direction length W1 of each first sipe and the tire widthwise direction length W2 of each second sipe have the following relationship;

$$0.15 \times w2 \leq W1 \leq 0.70 \times W2.$$

3. A pneumatic tire according to claim 1, wherein the first sipes are substantially equal in depth to the second sipes.

4. A pneumatic tire according to claim 1, wherein the at least one land has a sipe extension end wall surface located at an extension end of each first sipe and a sipe bottom surface located at a bottom of each first sipe, the sipe extension end wall surface being connected to the sipe bottom surface via a curved surface in the form of an circular arc in cross section having a radius R.

5. A pneumatic tire according to claim 4, wherein the radius R and the tire widthwise direction length W1 of each first sipe have the following relationship;

$$0.8 \times W1 \leq R \leq 1.5 \times W1.$$

6. A pneumatic tire according to claim 1, wherein each first sipe includes an extension end portion having edge portions on both sides thereof, at least one of the edge portions of each first sipe located on the remote side of the first sipe from a position in a first region of the tread surface where the first sipe is located having a chamfered shape, the position in a first region of the tread surface conforming to one of the sector divisional positions.

7. A pneumatic tire according to claim 1, wherein the at least one land has a groove side wall surface facing to the at least one circumferential groove and sipe side wall surfaces located on both sides of each first sipe, each first sipe having a sipe open part which is open to the groove side wall surface, sipe open end portions which face to the sipe open part being defined between the groove side wall surface and the sipe side wall surfaces, at least one of the sipe open end portions located on the remote side of the first sipe, from a position in a first region of the tread surface where the first sipe is located, being chamfered, the position in a first region of the tread surface conforming to one of the sector divisional positions.

8. A pneumatic tire according to claim 1, wherein the at least one land consists of a rib.

9. A pneumatic tire comprising:

a tread surface having lands defined by at least one circumferential groove which extends in a circumferential direction of the tire;

the tread surface being divided into a plurality of first regions and a plurality of second regions, wherein said first regions and said second regions are alternately circumferentially arranged around the tire, and further wherein said first regions and said second regions each extend from one axial edge of the tire to an opposite axial edge and an axially extending line extending from the one axial edge to the opposite axial edge defines adjacent edges of said first and second regions;

a plurality of first sipes in each of the first regions; and a plurality of second sipes in each of the second regions, wherein each of said first sipes has a tire widthwise direction length that is less than a tire widthwise direction length of each of said second sipes, wherein sipes in each of said first regions include said first sipes without including any of said second sipes and further wherein each of said first regions extends approximately 40 to 80 mm in the circumferential direction of the tire.

10. The pneumatic tire according to claim 9, wherein sipes in each of said second regions include second sipes without any of said first sipes.

11. A tire mold including an annular side mold section having a tread forming surface for forming a tread surface of a tire, the side mold section comprising:
   a plurality of sectors into which the side mold section is divided along a circumferential direction of the side mold section,
   the tread forming surface of the side mold section having sector divisional position vicinity regions, extending along an entire axial width of the annular side mold section, including sector divisional positions and sector divisional position distant regions, extending along an entire axial width of the annular side mold section, located therebetween,
   each sector including a tread forming surface section, at least one circumferential groove forming ridge which extends in a circumferential direction of the side mold section and sipe forming blades which are connected to at least one side surface of the at least one circumferential groove forming ridge and extend from the at least one side surface of the at least one circumferential groove forming ridge in a widthwise direction of the side mold section protruding on the tread forming surface section of each sector,
   the sipe forming blades having extension ends which are located within the tread forming surface section of each sector and being disposed at predetermined intervals along the circumferential direction of the side mold section,
   wherein the sipe forming blades comprise first sipe forming blades and second sipe forming blades, and each first sipe forming blade has a side mold section widthwise direction length W'1 that is less than the side mold section widthwise direction length W'2 of each second sipe forming blade,
   wherein the first sipe forming blades are disposed only in the sector divisional position vicinity regions and the second sipe forming blades are disposed only in the sector divisional position distant regions,
   and further wherein said tread forming surface of said side mold section, said sector divisional position vicinity region and said sector divisional position distant region are alternately arranged in the circumferential direction of the tire, the sector divisional position vicinity region being a region located between the sector divisional position and a position ranging from 20 to 40 mm from said sector divisional position on each side of the sector divisional position in the circumferential direction of the side mold section.

12. A tire mold according to claim 11, wherein the side mold section widthwise direction length W'1 of each first sipe forming blade and the side mold section widthwise direction length W'2 of each second sipe forming blade have the following relationship;

$$0.15 \times w'2 \leq W'1 \leq 0.70 \times W'2.$$

13. A tire mold according to claim 11, wherein the first sipe forming blades are substantially equal in height to the second sipe forming blades.

14. A tire mold according to claim 11, wherein each first sipe forming blade has an extension end surface and a top surface connected thereto, a corner which is defined between the extension end surface and the top surface being chamfered with a curved surface in the form of an circular arc in cross section having a radius R'.

15. A tire mold according to claim 14, wherein the radius R' and the side mold section widthwise direction length W'1 of each first sipe forming blade have the following relationship;

$$0.8 \times W'1 \leq R' \leq 1.5 \times W'1.$$

16. A tire mold according to claim 11, wherein each first sipe forming blade includes side surfaces on both sides thereof and an extension end surface extending between the side surfaces, corners being defined between the extension end surface and the side surfaces, at least one of the corners, located on the remote side of the first sipe forming blade from a sector divisional position in a sector divisional position vicinity region where the first sipe forming blade is located, being chamfered.

17. A tire mold according to claim 11, wherein each first sipe forming blade has side surfaces on both sides thereof connected to the at least one side surface of the at least one circumferential groove forming ridge, corners being defined between the at least one side surface of the at least one circumferential groove forming ridge and the side surfaces on the both sides of the first sipe forming blade, at least one of the corners, located on the remote side of the first sipe forming blade from a sector divisional position in a sector divisional position vicinity region where the first sipe forming blade is located, being arranged so as to have a filled structure.

18. A tire mold including an annular side mold section having a tread forming surface for forming a tread surface of a tire, the side mold section comprising:
   a plurality of sectors into which the side mold section is divided along a circumferential direction of the side mold section;
   the tread forming surface being divided into a plurality of sector divisional position vicinity regions that include sector divisional positions and a plurality of sector divisional position distant regions located between said sector divisional position vicinity regions, wherein said sector divisional position vicinity regions and said sector divisional position distant regions each extend from one axial edge of the annual side mold section to an opposite axial edge;
   a plurality of first sipe forming blades in each of the sector divisional position vicinity regions; and
   a plurality of second sipe forming blades in each of the sector divisional position distant regions,
   wherein each of said first sipe forming blades has a side mold section widthwise direction length that is less than a side mold section widthwise direction length of each of said second sipe forming blades,
   wherein sipe forming blades in each of said sector divisional position vicinity regions include said first sipe forming blades without including any of said second sipe forming blades,
   and further wherein said tread forming surface of said side mold section, said sector divisional position vicinity region and said sector divisional position distant region are alternately arranged in the circumferential direction of the tire, the sector divisional position vicinity region being a region located between the sector divisional position and a position ranging from 20 to 40 mm from said sector divisional position on each side of the sector divisional position in the circumferential direction of the side mold section.

19. The tire mold according to claim 18, wherein sipe forming blades in each of said sector divisional position distant regions include second sipe forming blades without any of said first sipe forming blades.

* * * * *